March 13, 1934.  R. BAUER  1,950,649
COLORGRAM AND METHOD OF MAKING AND USING THE SAME
Filed May 19, 1931
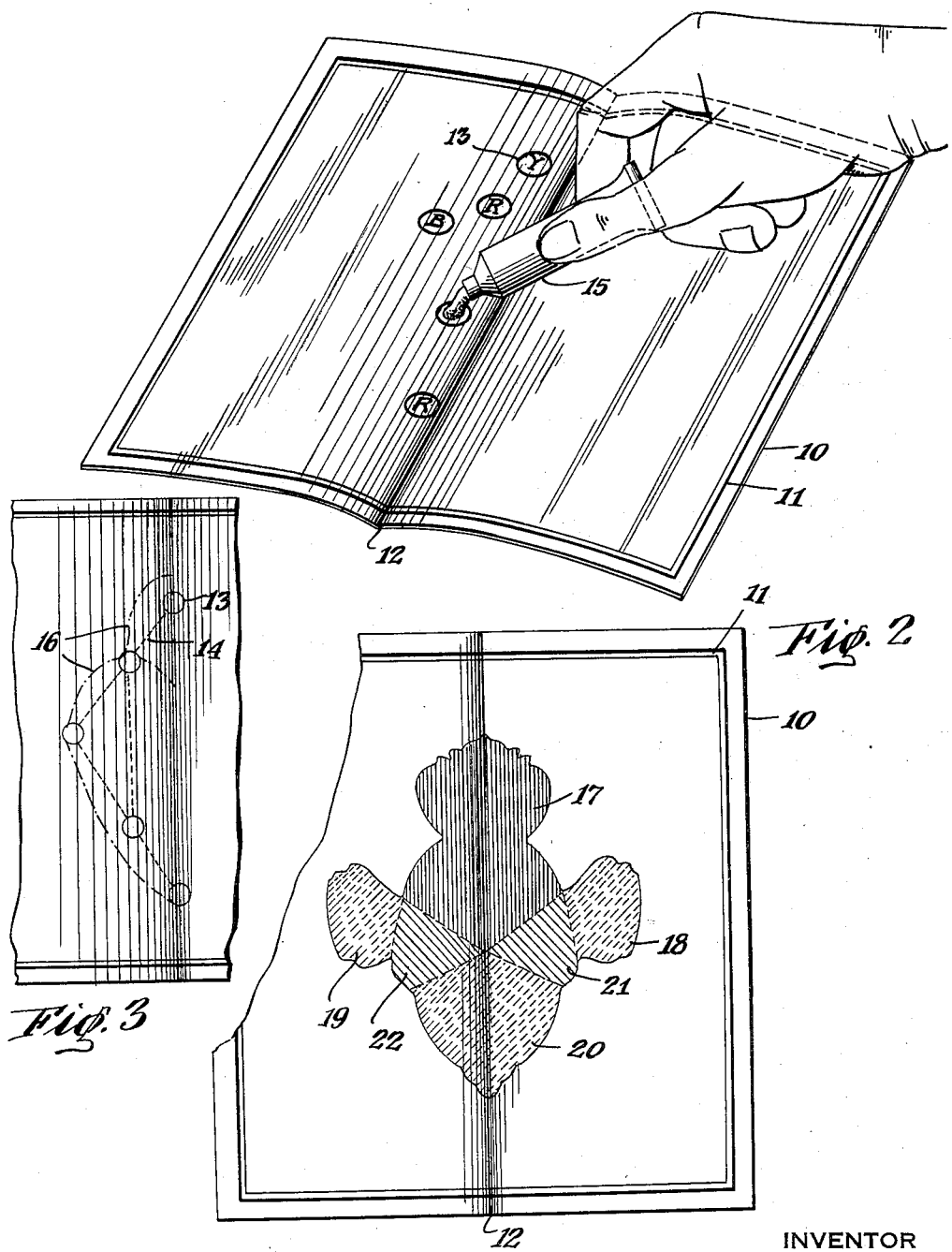
INVENTOR
Robert Bauer
BY his ATTORNEY Patented Mar. 13, 1934

1,950,649

UNITED STATES PATENT OFFICE 1,950,649

COLORGRAM AND METHOD OF MAKING AND USING THE SAME

Robert Bauer, New York, N. Y.

Application May 19, 1931, Serial No. 538,481

2 Claims. (Cl. 41—17)

This invention relates to improvements in color matching devices, and particularly to a chart which I call "colorgram" provided with marks to indicate the places where oil colors are to be placed to produce pictures of desired outlines and color grouping, said marks arranged in their relative constellation apt to give the best results in the production of colored pictures, and formed or constructed along certain geometrical outlines.

Another object of my invention is the provision of an entertaining and amusing game for young children which is also instructive and educational.

A further object of my invention is the provision of a method to make and use the colorgram.

A still further object of my invention is the provision of a colorgram which is simple and inexpensive to make, yet durable and efficient in operation.

These and other objects and advantages of my invention will become more fully known as the description proceeds, and will then be more specifically defined in the appended claims.

In the accompanying drawing forming a material part of this disclosure:

Fig. 1 is a perspective view of a colorgram chart constructed according to my invention.

Fig. 2 illustrates a finished picture.

Fig. 3 is a fragmentary view of a chart illustrating the manner of ascertaining the outlines of a picture to be produced.

As illustrated, my chart 10, is preferably made of paper, having marginal outlines 11 and divided in its middle by a median line 12.

To one side of the median line marks 13 are provided arranged in a predetermined relative constellation formed by geometrical lines 14 forming for instance the outlines of a triangle and extended beyond the angle points thereof, as for instance shown in Figure 3 by way of example. It will, however, be understood that any other suitable geometrical figures or outlines may be used.

The marks 13 may be circles or have any other form and carry the first letters of the colors to be deposited on the mark as for instance Y for yellow, R for red and B for blue, etc. It will be evident that these letters alone may also be placed upon the chart without any marks as for instance the circles used as an example in Figure 1.

The oil paint is preferably squeezed from tubes 15 in an adequate quantity upon the places indicated, as illustrated in Figure 1, on one side of the chart or card 10.

The card is then folded upon itself along the median line 12, and the oil paint deposited upon the marks on one side of the chart is transferred by means of a suitable burnisher flattening the card to the other, plain side of the chart to produce the outlines of a picture as indicated by the broken curved lines 16 in Figure 3.

In Figure 2, I have illustrated a picture having its upper part 17 made in red, the outer wings 18, 19, and the lower wing 20 in yellow and the body parts 21, 22 in blue color.

It will be evident that I can change the colors at will, so for instance I may use yellow and blue to form green parts of a picture, or red and blue to form purple and so on, using the ground colors to produce any color shade.

It will be understood that I have disclosed the preferred form of my invention as one example only of the many possible ways to practically construct the same, and that I may make such changes in my invention and in the method of practicing the same and in the minor details thereof as come within the scope of the appended claims without departure from the spirit of my invention, and the principles involved.

Having thus described my invention what I claim as new and desire to secure by Letters Patent is:

1. A colorgram chart comprising a body in shape of a parallelogram, marginal lines on said chart, a median line dividing said chart into equal halves, marks in form of circles bearing each a capital letter indicating the color to be used formed to one side of said median line to indicate the places of deposition of oil colors and lines connecting the circles to indicate the outlines of a design.

2. The method of producing pictures by oil paints consisting in forming marks having the form of circles, each bearing a capital letter representing the initial letter of the color to be used at the place of the circle to indicate various colors on one side of a chart, depositing the respective colors on said marks, arranging the circles along certain connecting lines determined by the outline of the picture design, folding the chart upon itself, and burnishing the folded chart to transfer the colors from one half of the chart to the other.

ROBERT BAUER.